(12) United States Patent
Isono et al.

(10) Patent No.: US 8,284,511 B2
(45) Date of Patent: Oct. 9, 2012

(54) MAGNETIC DISK CONTROLLER TO PROCESS PLURAL DATA SETS FOR RECORDING ONTO A MEDIUM

(75) Inventors: Soichi Isono, Kanagawa (JP); Minoru Tsukada, Kanagawa (JP); Tomoki Oura, Kanagawa (JP); Koji Takahashi, Kanagawa (JP)

(73) Assignee: Marvell International Ltd., Hamilton (BM)

( * ) Notice: Subject to any disclaimer, the term of this patent is extended or adjusted under 35 U.S.C. 154(b) by 199 days.

(21) Appl. No.: 12/634,300

(22) Filed: Dec. 9, 2009

(65) Prior Publication Data

US 2010/0088576 A1   Apr. 8, 2010

Related U.S. Application Data

(63) Continuation of application No. 12/012,321, filed on Feb. 1, 2008, now Pat. No. 7,639,443.

(60) Provisional application No. 60/889,199, filed on Feb. 9, 2007.

(30) Foreign Application Priority Data

Feb. 1, 2007   (JP) .................................. 2007-023008

(51) Int. Cl.
*G11B 5/09*   (2006.01)
*G11B 5/02*   (2006.01)

(52) U.S. Cl. ................. 360/53; 360/39; 360/24; 360/55
(58) Field of Classification Search ....................... None
See application file for complete search history.

(56) References Cited

U.S. PATENT DOCUMENTS

| 6,438,319 | B1 * | 8/2002 | Inoue et al. | 386/265 |
| 7,308,639 | B2 * | 12/2007 | Park et al. | 714/763 |
| 2004/0057360 | A1 * | 3/2004 | Banno | 369/47.31 |
| 2007/0220402 | A1 | 9/2007 | Hagi et al. | |
| 2008/0141099 | A1 | 6/2008 | Katoh et al. | |
| 2008/0172594 | A1 | 7/2008 | Unruh | |

FOREIGN PATENT DOCUMENTS

JP   07-141113   2/1995

* cited by examiner

*Primary Examiner* — Andrew L Sniezek (57) ABSTRACT

Systems, methods and computer program products for writing and reading a plurality of data sets and error codes are described. In some implementations, a magnetic disk controller can be provided that includes an error code unit configured to generate one or more error codes for each of a plurality of data sets to be written onto corresponding sectors of a medium. The magnetic disk controller can also include a buffer unit configured to store each data set and an error code in an associated buffer, and an encoding unit configured to encode the plurality of data sets. In some implementations, at least one data set is encoded concurrently with the buffer unit storing another different data set in the associated buffer. The magnetic disk controller can also include a control unit configured to write each encoded data set and a corresponding error code onto a corresponding sector.

13 Claims, 9 Drawing Sheets

MAGNETIC DISK CONTROLLER TO PROCESS PLURAL DATA SETS FOR RECORDING ONTO A MEDIUM

PRIORITY CLAIM

This application is a continuation of U.S. application Ser. No. 12/012,321 titled "MAGNETIC DISK CONTROLLER AND METHOD", filed on Feb. 1, 2008, which claims the benefit of U.S. Provisional Patent Application Ser. No. 60/889,199, filed Feb. 9, 2007, and the benefit of Japanese patent application serial number 2007-023008, filed Feb. 1, 2007. The entire teachings of the above applications are incorporated herein by reference.

TECHNICAL FIELD

The present invention relates to information storage.

BACKGROUND ART

A magnetic disk controller which, when reading data corresponding to each sector from a magnetic disk apparatus, transfers ID information regarding the sector before transferring the data of the sector has been proposed as, for example, in Japanese Patent Application publication No. 7-141113.

When writing data from a host into a magnetic disk, a magnetic disk controller obtains the address of a sector to which the data is to be written, and calculates an error check code based on the obtained address and the data to be written into the sector. Hence, the magnetic disk controller can not write the data and error check code into the sector immediately after obtaining the address of the sector. Accordingly, the magnetic disk controller keeps on hold the writing of the data and error check code until the sector comes back to the position of the magnetic head, which delays the writing of the data and error check code.

SUMMARY

The invention relates to information storage.

In a first aspect, a magnetic disk controller includes an interface that receives and transmits data to be written into a magnetic disk. The magnetic disk controller includes a first buffer and a second buffer each of which temporarily stores data that is received from the interface and is to be written into at least one sector of the magnetic disk. The magnetic disk controller includes an encoding unit that encodes the data stored in any of the first buffer and the second buffer into data representing a signal to be applied to the magnetic disk. The magnetic disk controller includes a buffer control unit that, while writing the data received from the interface into at least one of the first buffer and the second buffer, reads the data from the other buffer, causes the encoding unit to encode the read data, and stores the encoded data into the other buffer. A data width M between the encoding unit and the first and second buffers is at least equal to twice a data width N between the interface and the first and second buffers.

Implementations can include any, all or none of the following features. The encoding unit can include an encoding core unit that encodes the data; a read cache that reads the data, in units of the data width M, from at least one of the first and second buffers, divides the read data into pieces of data each having a data width smaller than the data width M, and outputs the pieces of data to the encoding core unit; and a write cache that combines a plurality of pieces of data which are separately received from the encoding core unit, and writes the combined data, in units of the data width M, into one of the first and second buffers. A sum of a data reading cycle from the first and second buffers to the encoding unit and a data writing cycle from the encoding unit to the first and second buffers can be substantially equal to a data writing cycle from the interface to the first and second buffers. The magnetic disk controller can include a third buffer that temporarily stores the encoded data which corresponds to at least one sector; and a writing control unit that reads the encoded data from the third buffer and writes the encoded data into the magnetic disk, wherein a sum of a data reading cycle from the first and second buffers to the encoding unit and a data writing cycle from the encoding unit to the first and second buffers can be substantially equal to a data reading cycle from the third buffer to the writing control unit. The buffer control unit can enable the first, second and third buffers to be used in rotation, by causing the first buffer to operate in a similar fashion to the second buffer, causing the second buffer to operate in a similar fashion to the third buffer, and causing the third buffer to operate in a similar fashion to the first buffer. Each of the buffers can be caused to contain respective data portions that are transferred between the buffers according to a predetermined sequence in which each data portion in an unencoded form is stored in one of the buffers and subsequently the data portion in an encoded form is stored in another one of the buffers, and is subsequently written to the magnetic disk. The magnetic disk controller can include a third buffer, and the data in the unencoded form can include at least former and latter portions of first, second, third and fourth data, and the data in the encoded form can include at least encoded former and latter portions of the first, second, third and fourth data, and the predetermined sequence can include at least: a first phase during which the former portion of the first data is stored in the first buffer; a second phase during which the latter portion of the first data is stored in the first buffer and the encoded former portion of the first data is stored in the second buffer; a third phase during which the former portion of the second data is stored in the first buffer, the encoded former portion of the first data is stored in the second buffer, and the encoded latter portion of the first data is stored in the second buffer; a fourth phase during which the latter portion of the second data is stored in the first buffer, the encoded latter portion of the first data is stored in the second buffer, and the encoded former portion of the second data is stored in the third buffer; a fifth phase during which the former portion of the third data is stored in the first buffer, the encoded former portion of the second data is stored in the third buffer, and the encoded latter portion of the second data is stored in the third buffer; a sixth phase during which the latter portion of the third data is stored in the first buffer, the encoded former portion of the third data is stored in the second buffer, and the encoded latter portion of the second data is stored in the third buffer; and a seventh phase during which the former portion of the fourth data is stored in the first buffer, the encoded former portion of the third data is stored in the second buffer, and the encoded latter portion of the third data is stored in the second buffer.

In a second aspect, a method of controlling writing of data into a magnetic disk includes temporarily storing, into each of a first buffer and a second buffer, data which is received from an interface configured to receive and transmit data to be written into the magnetic disk and which is to be written into at least one sector of the magnetic disk. The method includes encoding the data stored in any of the first buffer and the second buffer into data representing a signal to be applied to the magnetic disk. The method includes, while writing the data received from the interface into at least one of the first buffer and the second buffer, reading the data from another buffer, subjecting the read data to the encoding, and then storing the encoded data into the other buffer. A data width M between an encoding unit and the first and second buffers is at least equal to twice a data width N between the interface and the first and second buffers.

In a third aspect, a magnetic disk controller includes means for temporarily storing, into each of a first buffer and a second buffer, data which is received from an interface configured to receive and transmit data to be written into a magnetic disk and which is to be written into at least one sector of the magnetic disk. The magnetic disk controller includes means for encoding the data stored in any of the first buffer and the second buffer into data representing a signal to be applied to the magnetic disk. The magnetic disk controller includes means for, while writing the data received from the interface into at least one of the first buffer and the second buffer, reading the data from another buffer, subjecting the read data to the encoding, and then storing the encoded data into the other buffer. A data width M in the means for encoding is at least equal to twice a data width N between the interface and the first and second buffers.

In a fourth aspect, a magnetic disk controller includes an interface that receives and transmits data to be written into a magnetic disk. The magnetic disk controller includes a first buffer and a second buffer each of which temporarily stores data that is to be written into at least one sector of the magnetic disk. The magnetic disk controller includes an encoding unit that encodes the data stored in any of the first buffer and the second buffer into data representing a signal to be applied to the magnetic disk. A data width M between the encoding unit and the first and second buffers is at least equal to twice a data width N between the interface and the first and second buffers.

In a fifth aspect, a method of controlling writing of data into a magnetic disk includes temporarily storing, into each of a first buffer and a second buffer, data received from an interface which is to be written into at least one sector of a magnetic disk. The method includes encoding the data stored in any of the first buffer and the second buffer into data representing a signal to be applied to the magnetic disk. A data width M used in the encoding is at least equal to twice a data width N between the interface and the first and second buffers.

DESCRIPTION OF EXEMPLARY EMBODIMENTS

Hereinafter, some embodiments will be described. The embodiments do not limit the scope of the invention according to the claims, and all the combinations of the features described in the embodiments are not necessarily essential.

Figure 1:
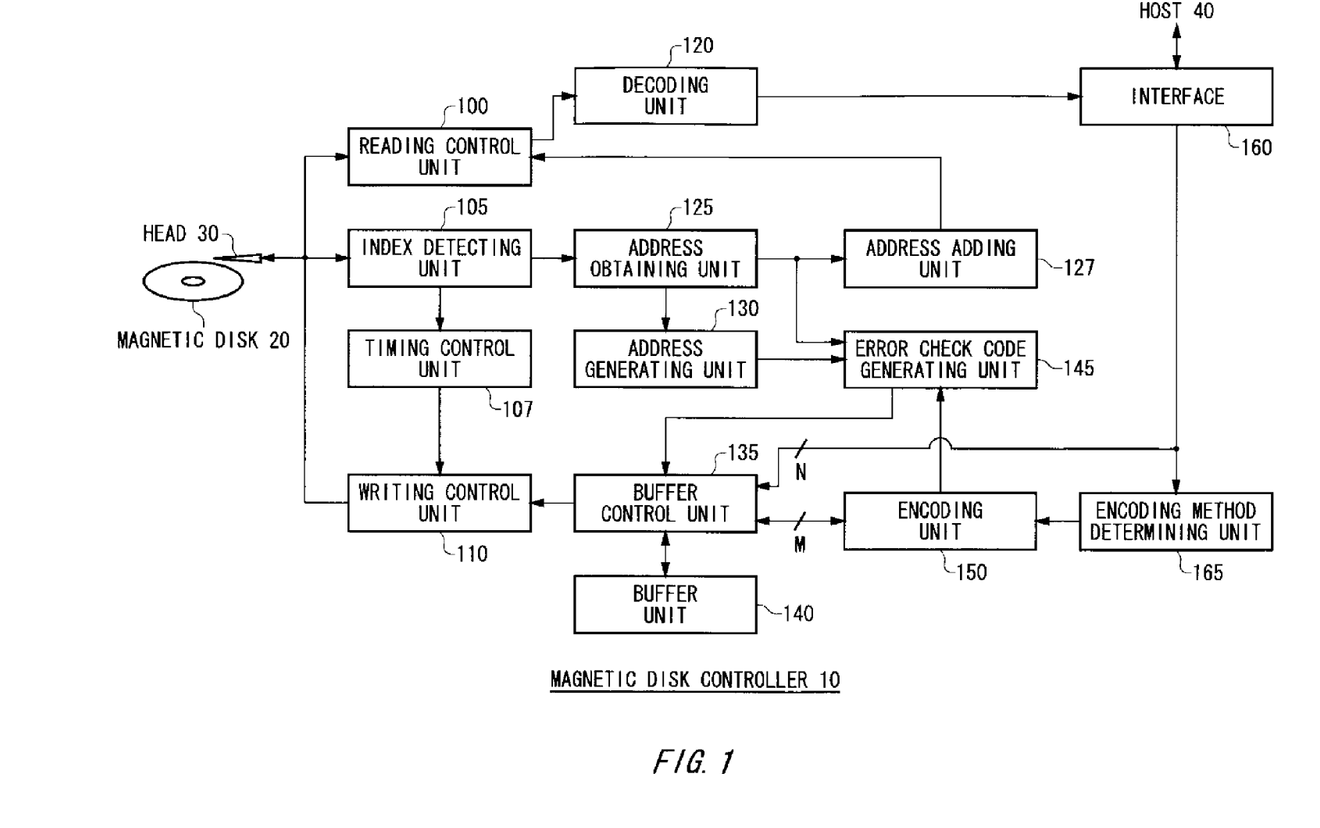
FIG. 1 is a block diagram showing a functional configuration of a magnetic disk controller 10.

FIG. 1 presents an example of an example functional configuration of a magnetic disk controller 10. The magnetic disk controller 10 here receives data from a host 40, and writes the data into a magnetic disk 20. In other words, the magnetic disk controller 10 controls writing of data performed via a head 30 into the magnetic disk 20. The host 40 can be a host computer, and can execute a predetermined command and data transmission/reception, for example by accessing a register group of a magnetic disk apparatus including therein the magnetic disk 20. The register group may include a control block register group and a command block register group.

An advantage of the magnetic disk controller 10 relating to the present embodiment is to write data and an error check code into a magnetic disk substantially immediately after generating the error check code based on the data.

The magnetic disk controller 10 in this example includes therein a reading control unit 100, an index detecting unit 105, a timing control unit 107, a writing control unit 110, a decoding unit 120, an address obtaining unit 125, an address adding unit 127, an address generating unit 130, a buffer control unit 135, a buffer unit 140, an error check code generating unit 145, an encoding unit 150, an interface 160, and an encoding method determining unit 165. It should be noted here that the magnetic disk 20 is a hard disk, for example.

The interface 160 transfers data to or from the magnetic disk 20. Specifically speaking, the interface 160 in some implementations receives, from the host 40, the data to be written into the magnetic disk 20, and transfers the data to the buffer control unit 135 and encoding method determining unit 165. Also, the interface 160 in some implementations receives data from the decoding unit 120, and transfers the data to the host 40. The index detecting unit 105 in some implementations detects, via the head 30, the index of the magnetic disk 20. The index detecting unit 105 in some implementations provides a signal representing a timing of the detection of the index to the address obtaining unit 125 and timing control unit 107.

In some implementations, the address generating unit 130 sequentially generates a physical address of a sector in accordance with a time period from the detection of the index by the index detecting unit 105. To be specific, the address generating unit 130 can receive, via the address obtaining unit 125, the signal representing the timing of the detection of the index from the index detecting unit 105, and sequentially generate a physical address of a sector in synchronization with the rotation of the magnetic disk 20. The address generating unit 130 can sequentially provide the generated physical address to the error check code generating unit 145. The address obtaining unit 125 can obtain a physical address on which reading data is stored. The address obtaining unit 125 can provide the obtained physical address to the address adding unit 127 and error check code generating unit 145. The address obtaining unit 125 can provide the signal representing the timing of the detection of the index, which can be received from the index detecting unit 105, to the address generating unit 130.

In some implementations, the error check code generating unit 145 generates a plurality of error check codes respectively for detecting errors of a plurality of pieces of write data. Specifically speaking, the error check code generating unit 145 can generate, after the index detecting unit 105 detects the index, a first error check code (CRC code) for first write data based on the first write data and a first physical address of a first sector subsequent to the detected index. Here, the error check code generating unit 145 may generate an error check code based on encoded data created by the encoding unit 150. The error check code generating unit 145 may generate, after the index detecting unit 105 detects the index, a first error correction code (ECC code) for the first write data based on the first write data and the first physical address of the first sector subsequent to the detected index.

The error check code generating unit 145 may generate the first error check code for the first write data based on the first write data and the first physical address of the first sector which is adjacent to the detected index. The error check code generating unit 145 may generate the first error check code for the first write data based on the first write data and the first physical address of the first sector which is generated by the address generating unit 130 in synchronization with the rotation of the magnetic disk 20. In addition, the error check code generating unit 145 can further generate a second error check code for second write data based on the second write data and a second physical address of a second sector which is generated by the address generating unit 130. The error check code generating unit 145 can provide a generated error check code and/or a generated error correction code to the buffer control unit 135.

In some implementations, the timing control unit 107 controls the timing at which the writing control unit 110 writes data into the magnetic disk 20, in accordance with the timing at which the index detecting unit 105 detects the index. The writing control unit 110 can write the data received from the buffer control unit 135 into the magnetic disk 20 via the head 30, at the timing controlled by the timing control unit 107. To be specific, the writing control unit 110 can control the head 30 so as to write the first error check code generated by the error check code generating unit 145, the first write data and the first physical address into a second sector subsequent to the first sector.

In some implementations, the writing control unit 110 causes the first error check code generated by the error check code generating unit 145, the first write data and the first physical address to be written into the second sector which is adjacent to the first sector on a side opposite from the index detected by the index detecting unit 105. The writing control unit 110 can cause the second error check code generated by the error check code generating unit 145, the second write data and the second physical address to be written into a third sector subsequent to the second sector. The writing control unit 110 can cause the second error check code generated by the error check code generating unit 145, the second write data and the second physical address to be written into the third sector which is adjacent to the second sector on a side opposite from the first sector.

In some implementations, the address adding unit 127 adds a predetermined value to the physical address obtained by the address obtaining unit 125. For example, the address adding unit 127 can add "1" to the physical address obtained by the address obtaining unit 125. When the error check code generating unit 145 requires a longer time period than a predetermined time period to generate an error correction code and/or an error check code, the address adding unit 127 may add an integer other than "1" (for example, integers larger than "1", such as "2" and/or "3") to the physical address obtained by the address obtaining unit 125. The address adding unit 127 can provide the result of the addition to the reading control unit 100. The reading control unit 100 can cause data to be read from a sector corresponding to the physical address generated by the address adding unit 127. The reading control unit 100 can provide the read data to the decoding unit 120. In other implementations, the address adding unit 127 can convert the physical address in another way, such as by subtraction, multiplication or division, or any other conversion operation.

In some implementations, the buffer unit 140 includes therein at least one buffer for temporarily storing data to be written into the magnetic disk 20. The buffer unit 140 can be controlled by the buffer control unit 135 so as to cause the at least one buffer to store temporarily the data to be written into the magnetic disk 20. The buffer unit 140 can provide the data stored on the buffer to the buffer control unit 135.

In some implementations, the buffer control unit 135 controls storing/reading data onto/from the buffer included in the buffer unit 140. The buffer control unit 135 can provide the data received from the buffer unit 140 to the encoding unit 150, and can cause the encoded data from the encoding unit 150 to be stored onto the buffer included in the buffer unit 140. The buffer control unit 135 can store the error check code generated by the error check code generating unit 145 onto the buffer included in the buffer unit 140. The buffer control unit 135 can read the data stored on the buffer included in the buffer unit 140, and can provide the read data to the writing control unit 110.

In some implementations, the encoding method determining unit 165 receives data to be written into the magnetic disk 20 from the interface 160, and determines an encoding method based on the received data. In some implementations, the encoding method determining unit 165 may transfer, to the encoding unit 150, the encoding method designated in advance by the user, independently from the data. The encoding method determining unit 165 can determine encoding methods to be used by the encoding unit 150 to encode a plurality of pieces of write data to be written into a plurality of sectors included in the magnetic disk 20, for example in such a manner that the encoding methods correspond to the pieces of write data in a one-to-one correspondence. In some implementations, the encoding method determining unit 165 can determine an appropriate encoding method by varying one or more of the factors including a minimum magnetization reversal interval, a maximum magnetization reversal interval, a bit length of original data and a bit length of encoded data, to name a few examples. For example, the encoding method determining unit 165 may choose an encoding method with the use of RLL codes. The encoding method determining unit 165 can provide information representing the determined encoding methods to the encoding unit 150.

In some implementations, the encoding unit 150 sequentially encodes the plurality of pieces of write data to be written into the plurality of sectors included in the magnetic disk 20 to create a plurality of pieces of data each representing a signal to be applied to the magnetic disk 20. For example, the encoding unit 150 can use the encoding method determined by the encoding method determining unit 165 in order to encode and thus convert the data (original data) received from the buffer control unit 135 into a different sequence of data that has a lower error rate than the original data. The encoding unit 150 can provide the encoded data to the buffer control unit 135 and error check code generating unit 145. The decoding unit 120 can decode the encoded data stored on the magnetic disk 20, which is received from the reading control unit 100, into the original data, and can provide the decoded data to the interface 160. In this example, the data width is M between the encoding unit 150 and buffer control unit 135, and the data width is N between the interface 160 and the buffer control unit 135, where the data width M may be equal to or larger than twice the data width N. In other implementations one or more other widths may be used.

The writing control unit 110 can write the error check code generated by the error check code generating unit 145 into the second sector subsequent to the first sector. In some implementations, this means that the error check code for the first sector is not stored on the first sector. The magnetic disk controller 10 may not need to hold the writing of the error check code for the first sector until the magnetic disk 20 rotates so that the first sector comes back to the head 30. As a consequence, the present embodiment can reduce a time period from when write data is obtained to when the error check code is written into the magnetic disk 20.

Figure 2:
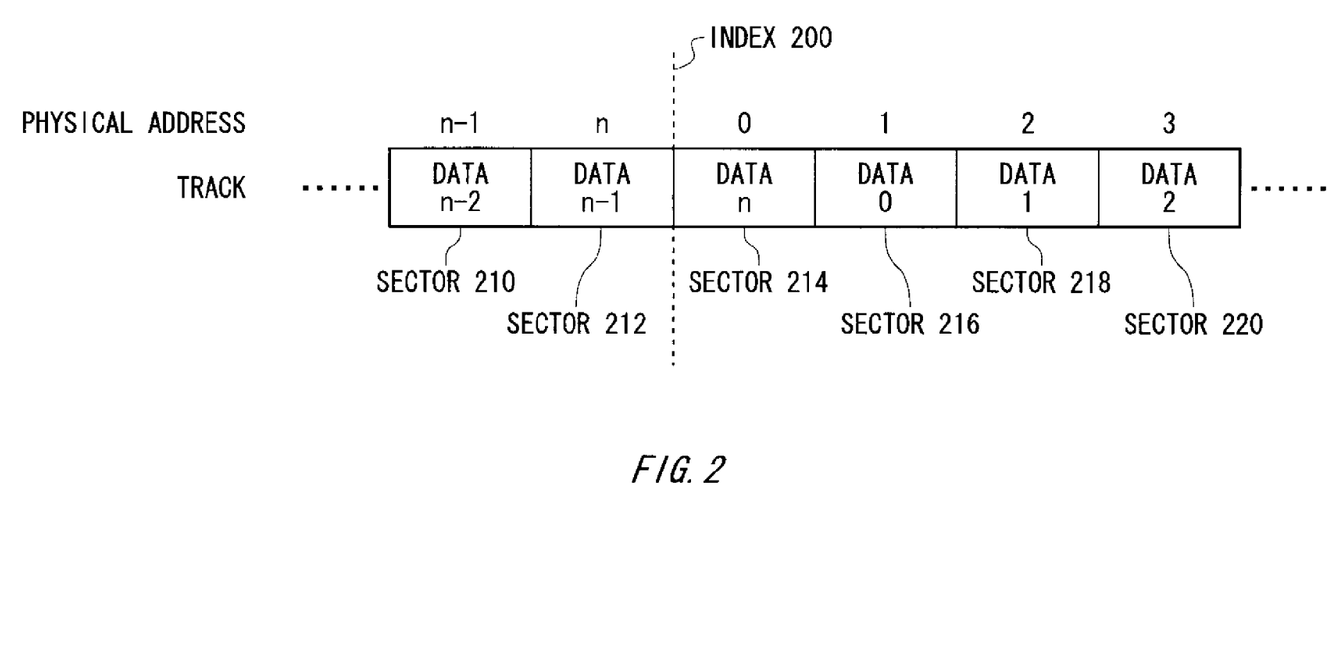
FIG. 2 shows writing of data into a magnetic disk 20.

FIG. 2 shows, as an example, writing of data into the magnetic disk 20 that can be performed by the magnetic disk controller 10. The magnetic disk controller 10 can store the first error check code for the first write data, which can be generated based on the first write data and the first physical address (e.g. physical address "0") of the first sector (e.g. the sector 214 associated with the physical address "0") subsequent to the index 200 detected by the index detecting unit 105, onto the sector 216 associated with the physical address "1" which follows the first sector. The magnetic disk controller 10 can write the first physical address and the first write data of the first sector 214 onto the sector 216 following the first sector 214.

In some implementations, the magnetic disk controller 10 may write the first error check code, first write data and first physical address, not into the sector 216 which immediately follows the first sector (e.g. sector 214), but into a sector (e.g. sector 220) which follows the sector 214 with a predetermined number of sectors therebetween. In the same manner, the magnetic disk controller 10 stores data in terms of the sectors 210, 212, 216, 218 and 220.

Figure 3:
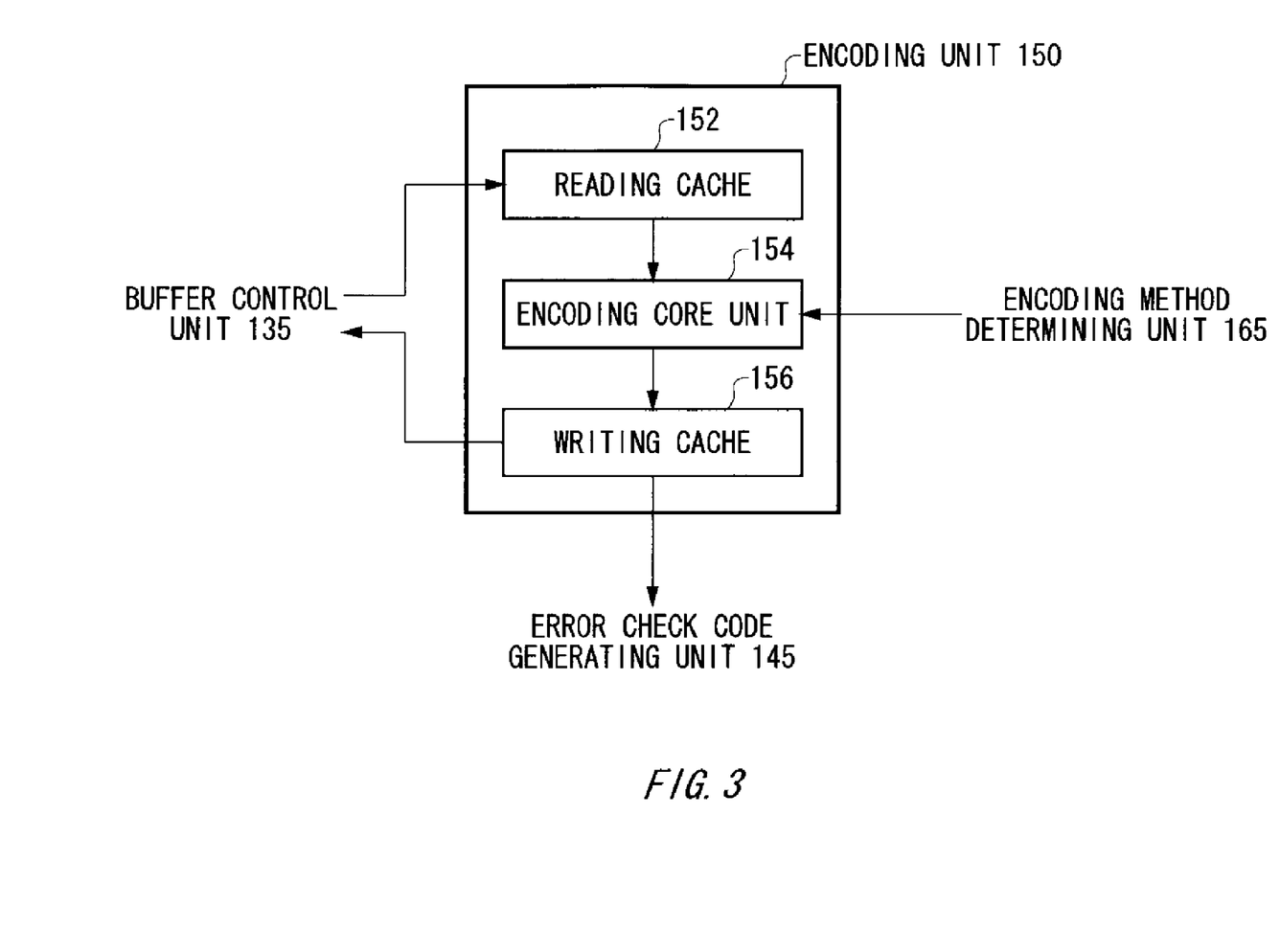
FIG. 3 is a block diagram showing a functional configuration of an encoding unit 150.

FIG. 3 shows an example of a functional configuration of the encoding unit 150. The encoding unit 150 here includes therein a reading cache 152, an encoding core unit 154 and a writing cache 156. The reading cache 152 can read the data stored on the buffer included in the buffer unit 140, for example in units of the data width M via the buffer control unit 135. The reading cache 152 can then divide the read data having the data width M into pieces of data each having a data width smaller than the data width M, and can output the pieces of data to the encoding core unit 154.

In some implementations, the encoding core unit 154 encodes the data. The encoding core unit 154 can encode the data received from the reading cache 152 by using the encoding method determined by the encoding method determining unit 165. The encoding core unit 154 can provide the encoded data to the writing cache 156. The writing cache 156 can combine pieces of data which are received one at a time from the encoding core unit 154, and then write the data into the buffer included in the buffer unit 140 in units of the data width M In some implementations, the writing cache 156 provides the data received from the encoding core unit 154 to the error check code generating unit 145.

Figure 4:
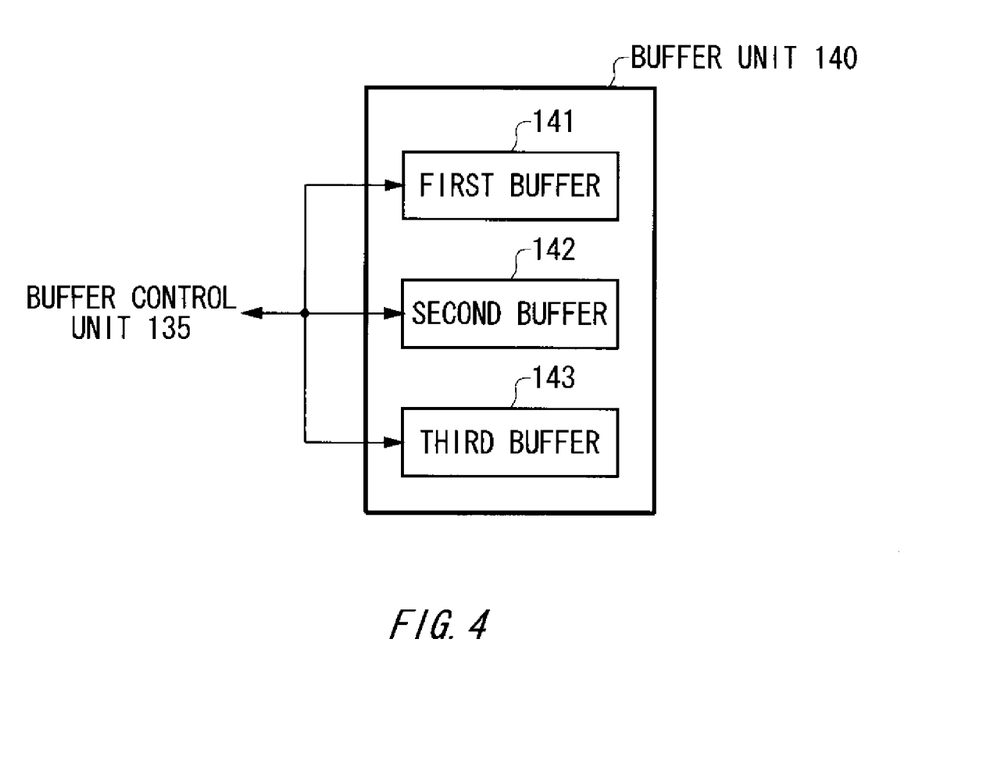
FIG. 4 is a block diagram showing a functional configuration of a buffer unit 140.

FIG. 4 shows an example of a functional configuration of the buffer unit 140. The buffer unit 140 here includes therein a first buffer 141, a second buffer 142 and a third buffer 143. One or more of the first, second and third buffers 141, 142 and 143 can be controlled by the buffer control unit 135 so as to store data thereon. As another example, the first, second and third buffers 141, 142 and 143 can be controlled by the buffer control unit 135 so as to provide data to the buffer control unit 135. One or more of the first, second and third buffers 141, 142 and 143 can temporarily store thereon data to be written into at least one sector of the magnetic disk 20, where the data can be received from the interface 160. As another example, one or more of the first, second and third buffers 141, 142 and 143 can temporarily store encoded data corresponding to at least one sector.

For example, the first buffer 141 can store thereon the first write data which has been encoded by the encoding unit 150 and is to be written into the first sector of the magnetic disk 20, and the first error check code for the first write data which is generated by the error check code generating unit 145. More specifically, the first buffer 141 can store the first error check code onto successive storage areas, after storing the first write data which has been encoded by the encoding unit 150 onto successive storage areas.

In some implementations, the second buffer 142 stores thereon the second write data which has been encoded by the encoding unit 150 and is to be written into the second sector of the magnetic disk 20, and the second error check code for the second write data which is generated by the error check code generating unit 145. For example, the second buffer 142 can store thereon the second write data and second error check code which are to be written into the second sector subsequent to the first sector of the magnetic disk 20. For example, the second buffer 142 can store thereon the second write data and second error check code which are to be written into the second sector which is adjacent and subsequent to the first sector of the magnetic disk.

In some implementations, the third buffer 143 stores thereon the third write data which has been encoded by the encoding unit 150 and is to be written into the third sector of the magnetic disk 20, and the third error check code for the third write data which is generated by the error check code generating unit 145. For example, the third buffer 143 can store thereon the third write data and third error check code which are to be written into the third sector subsequent to the second sector of the magnetic disk 20. For example, the third buffer 143 can store thereon the third write data and third error check code which are to be written into the third sector which is adjacent and subsequent to the second sector of the magnetic disk 20.

When the buffer unit 140 is configured in the above-described manner in some implementations, the buffer control unit 135 controls, in a first period, the first write data and first error check code stored on the first buffer 141 to be written into the first sector of the magnetic disk 20, concurrently with controlling the second write data which has been encoded by the encoding unit 150 and the second error check code generated by the error check code generating unit 145 to be stored onto the second buffer 142. Here, the buffer control unit 135 may read and output, one at a time and alternately, portions of the first write data stored on the first buffer 141 and portions of the first error check code stored on the first buffer 141. The buffer control unit 135 can cause the output first write data and first error check code to be written into the first sector of the magnetic disk 20. The first error check code generated by the error check code generating unit 145 can, in some implementations, be stored on the first buffer 141 and written into the first sector of the magnetic disk 20 without being encoded.

In some implementations, when outputting the first error check code and first write data, the buffer control unit 135 may sequentially insert a predetermined amount of the first error check code into the first write data at predetermined intervals. For example, assume that the first write data has a data amount of 512 bytes. The buffer control unit 135 can partition the first error check code in units of 5 to 11 into pieces of data, for example, and can insert the pieces of data into the first write data when outputting the first write data and first error check code. If the first write data has a data amount of 1,024 bytes, the buffer control unit 135 in some implementations partitions the first error check code in units of 8 to 22 into pieces of data, for example, and can insert the pieces of data into the first write data when outputting the first write data and first error check code. In some implementations if the first write data has a data amount of 4,096 bytes, the buffer control unit 135 partitions the first error check code in units of 8 to 20 into pieces of data, for example, and can insert the pieces of data into the first write data when outputting the first write data and first error check code. In other implementations, one or more other numbers of units and/or other data amount(s) can be used.

In some implementations, the buffer control unit 135 controls, in the first period, the first write data and first error check code stored on the first buffer 141 to be written into the first sector of the magnetic disk, and controls the second write data which has been encoded by the encoding unit 150 and the second error check code generated by the error check code generating unit 145 to be stored onto the second buffer 142, concurrently with controlling the third write data which has not been encoded by the encoding unit 150 to be written into the third buffer 143. In a second period following the first period, the buffer control unit 135 can control the second write data and second error check code stored on the second buffer 142 to be written into the second sector of the magnetic disk 20, concurrently with controlling the third write data which has been encoded by the encoding unit 150 and the third error check code generated by the error check code generating unit 145 to be stored onto the third buffer 143, to replace the third write data which has not been encoded by the encoding unit 150.

In some implementations, concurrently with the buffer control unit 135 controlling the third write data which has not been encoded by the encoding unit 150 to be stored onto the third buffer 143, the encoding method determining unit 165 can receive the third write data and determine the encoding method to be used by the encoding unit 150 to encode the third write data. The encoding method determining unit 165 can determine the encoding method to be one of, for example, RZ method, RB method, NRZ method, PM method, PE method, FM method and the like. The encoding unit 150 can encode the data stored on the first and second buffers 141 and 142 into encoded data representing signals to be applied to the magnetic disk 20.

In the above-described case, while writing the data received from the interface 160 into at least one of the first and second buffers 141 and 142, the buffer control unit 135 can read data from the other buffer. Following this, in some implementations, the buffer control unit 135 uses the encoding unit 150 to encode the read data, and stores the encoded data into the other buffer. For example, the data width M between the encoding unit 150 and the first and second buffers 141 and 142 may be equal to or larger than twice the data width N between the interface 160 and the first and second buffers 141 and 142.

In some implementations, the reading cache 152 in the encoding unit 150 reads the data from the first and second buffers 141 and 142 in units of the data width M The reading cache 152 can then divide the read data into pieces of data having a smaller data width than the data width M, and can output the pieces of data to the encoding core unit 154. Subsequently, the writing cache 156 can combine pieces of data which are respectively received on separate occasions from the encoding core unit 154. The writing cache 156 can then write the combined pieces of data in units of the data width M onto one of the first and second buffers 141 and 142.

In some implementations, the magnetic disk controller 10 is designed so that the sum of the data reading cycle from the first and second buffers 141 and 142 to the encoding unit 150 and the data writing cycle from the encoding unit 150 to the first and second buffers 141 and 142 is substantially equal to the data writing cycle from the interface 160 to the first and second buffers 141 and 142.

In some implementations, the writing control unit 110 reads the encoded data from the third buffer 143 and writes the read encoded data into the magnetic disk 20. For example, the magnetic disk controller 10 can be designed so that the sum of the data reading cycle from the first and second buffers 141 and 142 to the encoding unit 150 and the data writing cycle from the encoding unit 150 to the first and second buffers 141 and 142 is substantially equal to the data reading cycle from the third buffer 143 to the writing control unit 110.

In some implementations, the buffer control unit 135 controls the first buffer 141 to function in the same manner as the second buffer 142, controls the second buffer 142 to function in the same manner as the third buffer 143, and controls the third buffer 143 to function in the same manner as the first buffer 141. In this way, the buffer control unit 135 can use the first, second and third buffers 141, 142 and 143 in rotation in some implementations.

Figure 5:
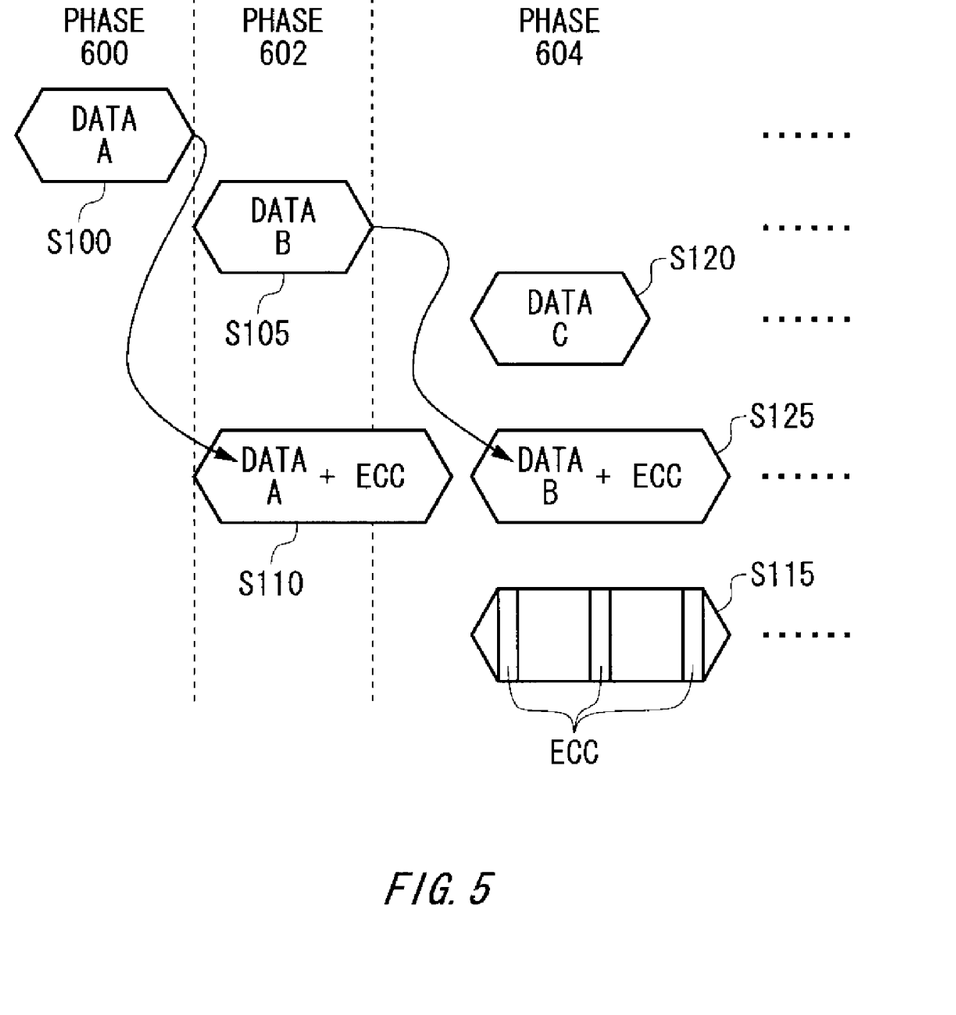
FIG. 5 shows writing of data into the magnetic disk 20.

FIG. 5 shows, as an example, writing of data into the magnetic disk 20 performed by, for example, the magnetic disk controller 10. To begin with, data (e.g. data A) can be stored onto the first buffer 141 in a phase 600 (S100). Subsequently, data (e.g. data B) can be stored onto the second buffer 142 in a phase 602 (S105). In synchronization with the timing at which the data is stored onto the second buffer 142, the data stored on the first buffer 141 can be encoded by the encoding unit 150, and then stored back onto the first buffer 141 (S110). Also, an error check code and/or error correction code can be generated by the error check code generating unit 145 for the data stored on the first buffer 141, and can be stored onto the first buffer 141 together with the encoded data (S110).

In a phase 604 following the phase 602, the error check code and/or error correction code stored on the first buffer 141 can be stored onto the magnetic disk 20 together with the data, in a state of being partitioned and inserted at predetermined intervals (S115). Meanwhile, data (e.g. data C) can be stored onto the third buffer 143 (S120). In synchronization with the timing at which the data is stored onto the third buffer 143, the data stored on the second buffer 142 can be encoded by the encoding unit 150, and stored back onto the second buffer 142 (S125). As another example, an error check code and/or error correction code can be generated by the error check code generating unit 145 for the data stored on the second buffer 142, and can be stored onto the second buffer 142 (S125).

Figure 6:
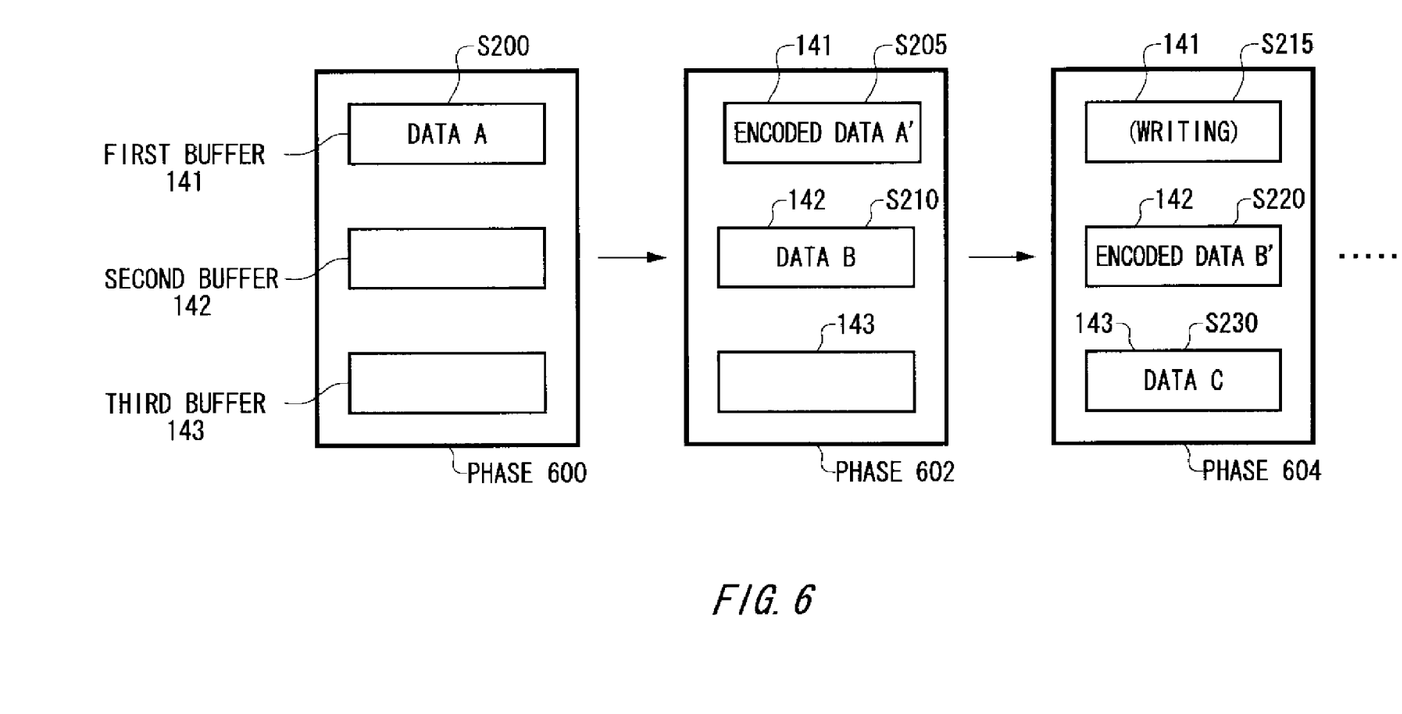
FIG. 6 shows writing of data into the magnetic disk 20.

FIG. 6 shows, as an example, writing of data into the magnetic disk 20 performed by, for example, the magnetic disk controller 10. To begin with, the buffer control unit 135, in some implementations, controls data (e.g. data A) to be stored onto the first buffer 141 in the phase 600 (S200). In the following phase 602, the data A stored on the first buffer 141 can be encoded by the encoding unit 150. The buffer control unit 135 can control the encoded data A' created by the encoding unit 150 to be stored onto the first buffer 141 (S205). In synchronization with the timing of storing the encoded data A' onto the first buffer 141, the buffer control unit 135 can control data (e.g. data B) to be stored onto the second buffer 142 (S210).

In the phase 604, the buffer control unit 135, in some implementations, controls the encoded data A' stored on the first buffer 141 to be written into the magnetic disk 20 (S215). As another example, the data B stored on the second buffer 142 can be encoded by the encoding unit 150. The buffer control unit 135 can control the encoded data B' created by the encoding unit 150 to be stored onto the second buffer 142 (S220). In synchronization with the timing of storing the encoded data B' onto the second buffer 142, the buffer control unit 135, in some implementations controls data (e.g. data C) to be stored onto the third buffer 143 (S230).

Figure 7:
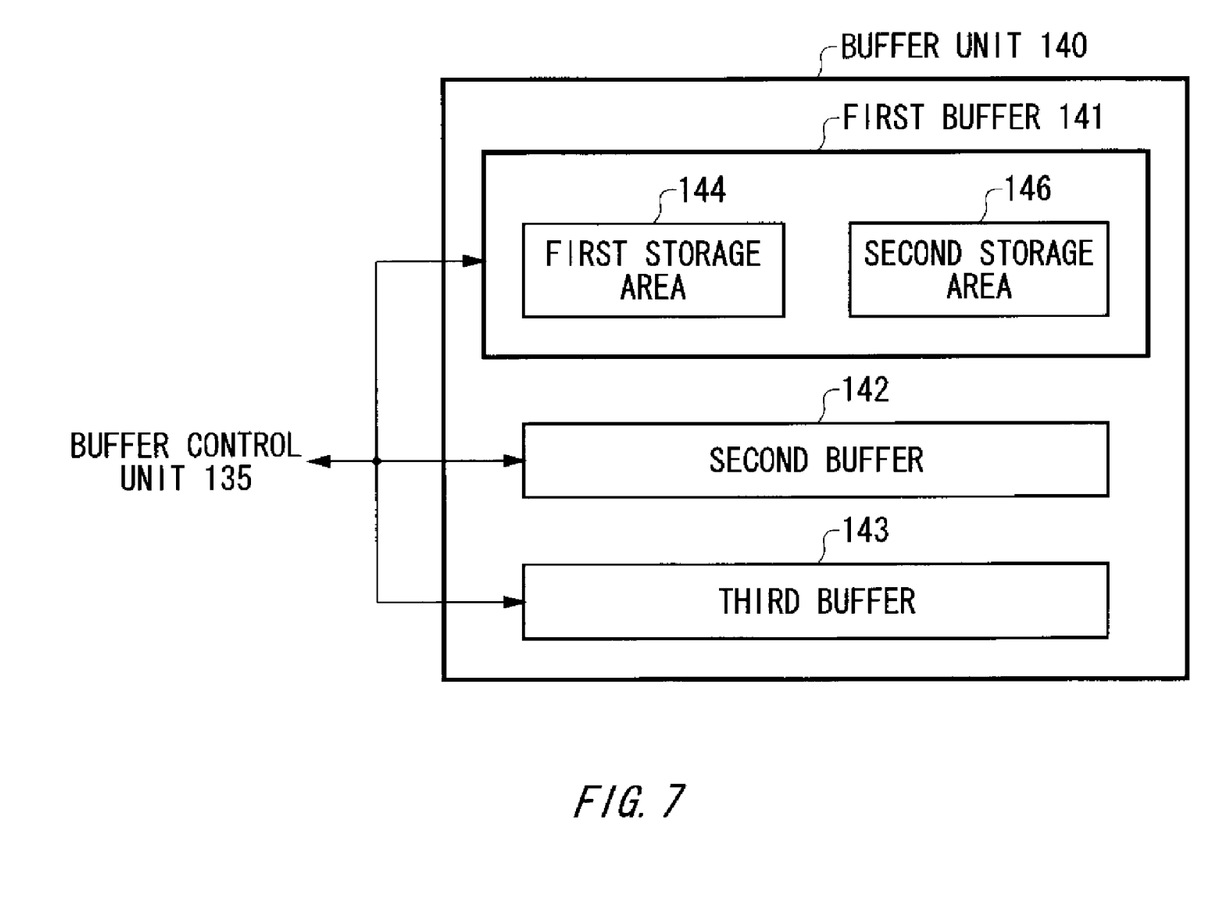
FIG. 7 is a block diagram showing a functional configuration of the buffer unit 140.

FIG. 7 shows an example of a functional configuration of the buffer unit 140. The buffer unit 140 here includes therein the first, second and third buffers 141, 142 and 143. The first buffer 141 here includes therein a first storage area 144 and a second storage area 146.

In some implementations, the first buffer 141 includes therein the first storage area 144 for sequentially storing former half data, out of former half data and latter half data constituting each of a plurality of pieces of write data to be written into the plurality of sectors of the magnetic disk 20. As another example, the first buffer 141 includes therein the second storage area 146 for sequentially storing the latter half data included in each of the plurality of pieces of write data. In some implementations, as long as the sum of the data amount of the former half data and the data amount of the latter half data is equal to the data amount of data to be written into each sector, the data amount of the former half data and the data amount of the latter half data may be designed different from each other.

In some implementations, the first buffer 141 stores former half data received from the buffer control unit 135 onto the first storage area 144. After this, the first buffer 141 can store latter half data received from the buffer control unit 135 onto the second storage area 146. Concurrently with the latter half data of the first write data to be written into the first sector of the magnetic disk 20 is being stored onto the second storage area 146, the encoding unit 150 can receive, from the buffer control unit 135, the former half data of the first write data, which may have been stored on the first storage area 144. Subsequently, the encoding unit 150 can encode the received former half data into data representing a signal to be applied to the magnetic disk 20.

In some implementations the second buffer 142 receives the former half data of the first write data, which has been encoded by the encoding unit 150, from the buffer control unit 135 and stores the former half data thereon. After storing thereon the former half data and latter half data of the first write data which have been encoded by the encoding unit 150, the second buffer 142 can receive the first error check code for the first write data, which is generated by the error check code generating unit 145, from the buffer control unit 135, and can store thereon the first error check code. For example, after receiving the first write data including the former half data and latter half data which have been encoded by the encoding unit 150 from the buffer control unit 135 and storing the first write data onto successive storage areas, the second buffer 142 can store the first error check code onto successive storage areas.

In some implementations, the buffer control unit 135 controls the former half data of the first write data which is stored on the second buffer 142 to be written into the first sector of the magnetic disk 20. For example, concurrently with the former half data of the second write data to be written into the second sector of the magnetic disk 20 being stored onto the first storage area 144, the encoding unit 150 can receive the latter half data of the first write data, which has been stored on the second storage area 146, from the buffer control unit 135, and encodes the latter half data. After storing thereon the former half data of the first write data, the second buffer 142 stores thereon the latter half data of the first write data which has been encoded by the encoding unit 150.

Following this, after controlling the former half data of the first write data to be written into the magnetic disk 20, the buffer control unit 135, in some implementations, controls the latter half data of the first write data, which is stored on the second buffer 142, to be written into the first sector of the magnetic disk 20. For example, along with the former half data and latter half data of the first write data, the buffer control unit 135 can controls the first error check code which is stored on the second buffer 142 to be written into the first sector of the magnetic disk 20. For example, the buffer control unit 135 can read and output, one at a time and alternately, portions of the first write data and first error check code which are stored on the second buffer 142. Then, the buffer control unit 135 controls the output first write data and first error check code to be written into the first sector of the magnetic disk 20.

In this case, the first error check code generated by the error check code generating unit 145 may in some implementations be stored onto the second buffer 142 and written into the first sector of the magnetic disk 20 without being encoded. When outputting the first error check code and first write data, the buffer control unit 135 may insert a predetermined data amount of the first error check code into the first write data at predetermined intervals.

Concurrently with the latter half data of the second write data being stored onto the second storage area 146, the encoding unit 150 can receive the former half data of the second write data which has been stored on the first storage area 144 from the buffer control unit 135 and encodes the former half data. After this, concurrently with the former half data of the third write data to be written onto the third sector of the magnetic disk 20 being stored onto the first storage area 144, the encoding unit 150 can encode the latter half data of the second write data which has been stored on the second storage area 146.

After receiving the former half data of the second write data which has been encoded by the encoding unit 150 from the buffer control unit 135 and storing the former half data, the third buffer 143 in some implementations receives the latter half data of the second write data which has been encoded by the encoding unit 150 from the buffer control unit 135 and stores the latter half data. Subsequently, after controlling the first write data which is stored on the second buffer 142 to be written into the first sector, the buffer control unit 135 can control the second write data which is stored on the third buffer 143 to be written into the second sector.

The encoding method determining unit 165 in some implementations determines encoding methods to be used by the encoding unit 150 to encode the plurality of pieces of write data to be written into the plurality of sectors of the magnetic disk 20, for example, so that each of the encoding methods corresponds to the former half data or latter half data of a corresponding one of the plurality of pieces of write data. For example, concurrently with the former half data of the first write data being stored onto the first storage area 144, the encoding method determining unit 165 can receive the former half data of the first write data, and determine the encoding method to be used by the encoding unit 150 to encode the former half data of the first write data. As another example, concurrently with that the latter half data of the first write data is being stored onto the second storage area 146, the encoding method determining unit 165 can receive the latter half data of the first write data, and can determine the encoding method to be used by the encoding unit 150 to encode the latter half data of the first write data.

Figure 8:
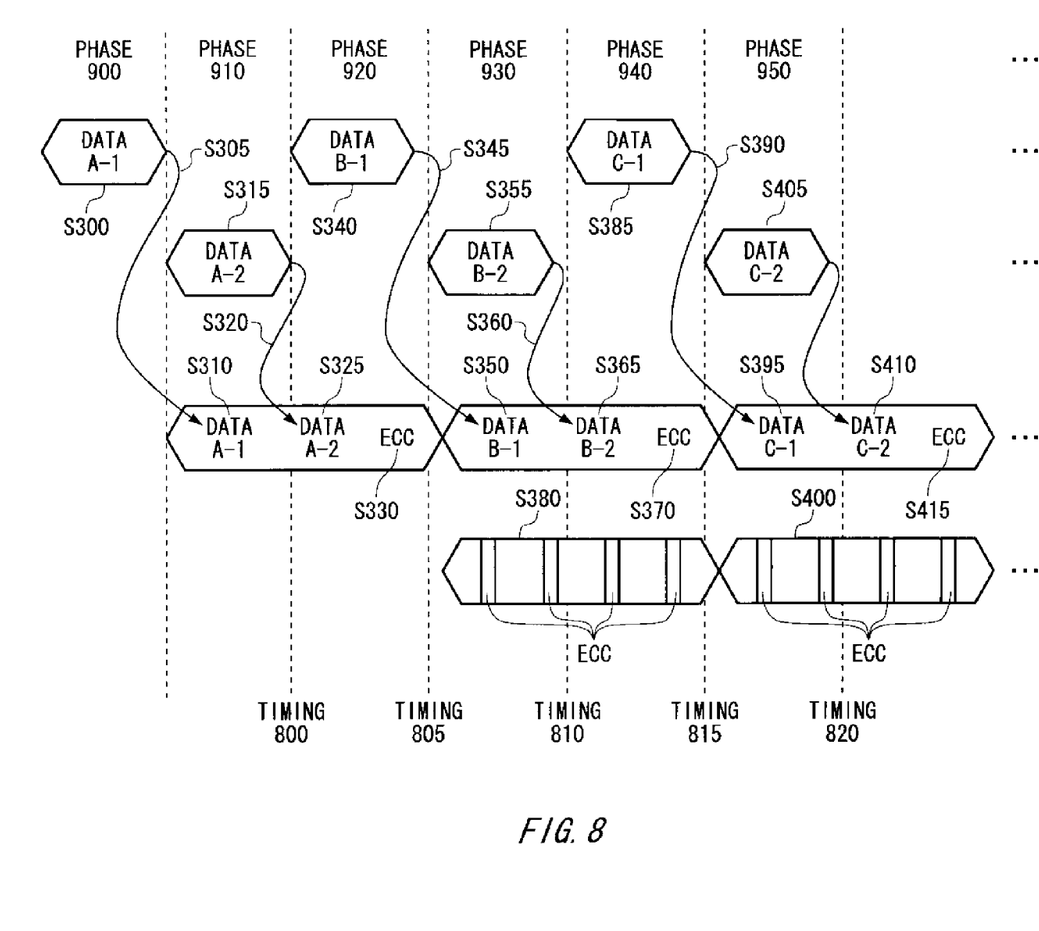
FIG. 8 shows writing of data into the magnetic disk 20.

FIG. 8 shows, as an example, writing of data into the magnetic disk 20 that can be performed by, for example, the magnetic disk controller 10. To begin with, in a phase 900, the buffer control unit 135 can store former half data (e.g. data A-1) onto the first storage area 144 (S300). In the following phase 910, the buffer control unit 135 can control the data A-1 which is stored on the first storage area 144 to be encoded by the encoding unit 150, and can control the encoded data A-1 to be stored onto the second buffer 142 (S305 and S310). For example, the buffer control unit 135 can control the encoded data A-1 to be provided from the encoding unit 150 to the error check code generating unit 145.

In some implementations, in the phase 910, the buffer control unit 135 controls latter half data (e.g. data A-2, where the data A-1 and data A-2 together form one piece of data A) to be stored onto the second storage area 146 (S315). At a timing 800 between the phase 910 and a phase 920, the buffer control unit 135 can control the data A-2 which is stored on the second storage area 146 to be encoded by the encoding unit 150, and can control the encoded data A-2 to be stored onto the second buffer 142 (S320 and S325). As another example, the buffer control unit 135 can control the encoded data A-2 to be provided from the encoding unit 150 to the error check code generating unit 145.

In the following phase 920, the buffer control unit 135 in some implementations can control data B-1, which can be a different former half data than the data A-1, to be stored onto the first storage area 144 (S340). Meanwhile, the error check code generating unit 145 can generate an error check code and/or error correction code based on the encoded data A-1 and data A-2. The buffer control unit 135 can store the error check code and/or error correction code generated by the error check code generating unit 145 into the second buffer 142 (S330).

At a timing 805 between the phase 920 and a phase 930, the buffer control unit 135 in some implementations stores data B-2 (the data B-1 and data B-2 together form one piece of data B), which can be a different latter half data than the data A-2, onto the second storage area 146 (S355). Meanwhile, the buffer control unit 135 in some implementations controls the data B-1 which is stored on the first storage area 144 to be encoded by the encoding unit 150, and controls the encoded data B-1 to be stored onto the second buffer 142 (S345 and S350). As another example, the buffer control unit 135 can control the encoded data B-1 to be provided from the encoding unit 150 to the error check code generating unit 145.

At the timing 805, before storing the encoded data B-1 onto the second buffer 142, the buffer control unit 135 in some implementations controls the encoded data A-1 and A-2 and the error correction code and/or error check code which is generated based on the encoded data A-1 and A-2, which may all be stored on the second buffer 142, to be output and written onto the magnetic disk 20. In this case, the buffer control unit 135 can partition the error check code and/or error correction code into pieces of data and can write the pieces of data into a writing area of the magnetic disk 20 at predetermined intervals (S380).

Subsequently, at a timing 810 between the phase 930 and a phase 940, the buffer control unit 135 in some implementations controls the data B-2 which is stored on the second storage area 146 to be encoded by the encoding unit 150, and controls the encoded data B-2 to be stored onto the second buffer 142 (S360 and S365). The buffer control unit 135 can also control the encoded data B-2 to be provided from the encoding unit 150 to the error check code generating unit 145. As another example, the buffer control unit 135 can store data C-1, which can be a different former half data than the data A-1 and data B-1, onto the first storage area 144 at the timing 810 (S385).

In the phase 940, the error check code generating unit 145 in some implementations generates an error check code and/or error correction code based on the encoded data B-1 and encoded data B-2. The buffer control unit 135 can store the error check code and/or error correction code which is generated by the error check code generating unit 145 onto the second buffer 142 (S370).

In some implementations, at a timing 815 between the phase 940 and a phase 950, the buffer control unit 135 stores data C-2 (the data C-1 and data C-2 together form one piece of data C), which can be a different latter half data than the data A-2 and data B-2, onto the second storage area 146 (S405). Meanwhile, the buffer control unit 135 can control the data C-1 which is stored on the first storage area 144 to be encoded by the encoding unit 150, and can control the encoded data C-1 to be stored onto the second buffer 142 (S390 and S395). As another example, the buffer control unit 135 can control the encoded data C-1 to be provided from the encoding unit 150 to the error check code generating unit 145.

In some implementations, before storing the encoded data C-1 onto the second buffer 142, the buffer control unit 135 can control the encoded data B-1 and B-2 and the error correction code and/or error check code which is generated based on the encoded data B-1 and B-2, which are all stored on the second buffer 142, to be output and written into the magnetic disk 20. For example, the buffer control unit 135 can partition the error check code and/or error correction code into pieces of data and write the pieces of data into a writing area of the magnetic disk 20 at predetermined intervals (S400).

In some implementations, at a timing 820 between the phase 950 and the next phase, the buffer control unit 135 controls the data C-2 which is stored on the second storage area 146 to be encoded by the encoding unit 150, and can control the encoded data C-2 to be stored onto the second buffer 142 (S410). For example, the buffer control unit 135 can control the encoded data C-2 to be provided from the encoding unit 150 to the error check code generating unit 145. Here, in the phase subsequent to the phase 950, the error check code generating unit 145 can generate an error check code and/or error correction code based on the encoded data C-1 and encoded data C-2. The buffer control unit 135 can store the error check code and/or error correction code generated by the error check code generating unit 145 onto the second buffer 142 (S415).

In some implementations, the magnetic disk controller 10 divides one piece of data into former half data and latter half data, and encodes each of the former half data and latter half data. For example, the magnetic disk controller 10 can partition an error check code and/or error correction code, which can be generated based on the encoded former half data and encoded latter half data, into pieces of data, and can store the pieces of data onto the magnetic disk 20 at predetermined intervals.

Figure 9:
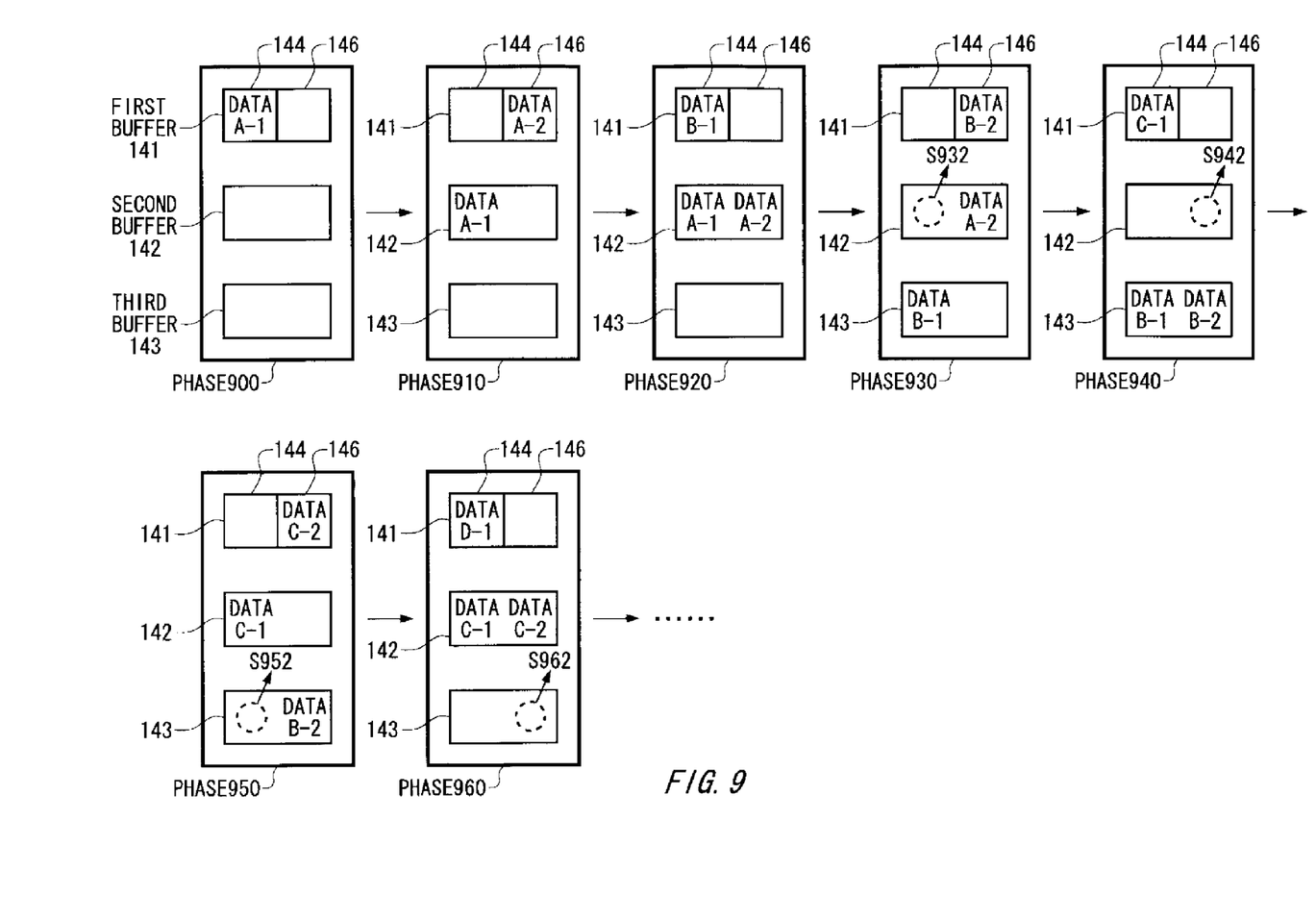
FIG. 9 shows writing of data into the magnetic disk 20.

FIG. 9 shows, as an example, writing of data into the magnetic disk 20 that can be performed by, for example, the magnetic disk controller 10. To begin with, in a phase 900, the buffer control unit 135 can store data A-1, which is part of data A, onto the first storage area 144 in the first buffer 141. In a phase 910, the buffer control unit 135 can control the data A-1 stored on the first storage area 144 to be encoded by the encoding unit 150, and can store the encoded data A-1 onto the second buffer 142. In some implementations, the buffer control unit 135 controls the encoded data A-1 to be provided to the error check code generating unit 145. The buffer control unit 135 can store data A-2, which is the remaining portion of the data A, onto the second storage area 146 in the first buffer 141.

Subsequently in a phase 920, the buffer control unit 135 in some implementations stores data B-1, which is part of data B, onto the first storage area 144. The buffer control unit 135 can control the data A-2 stored on the second storage area 146 to be encoded by the encoding unit 150, and can store the encoded data A-2 onto the second buffer 142. The buffer control unit 135 can control the encoded data A-2 to be provided to the error check code generating unit 145. The error check code generating unit 145 can generate an error check code and/or error correction code for the data A based on the encoded data A-1 and encoded data A-2. The buffer control unit 135 can store the error check code and/or error correction code which is generated by the error check code generating unit 145 onto the second buffer 142.

In a phase 930, the buffer control unit 135 in some implementations stores data B-2, which is the remaining portion of the data B, onto the second storage area 146. In some implementations, the buffer control unit 135 controls the data B-1 which is stored on the first storage area 144 to be encoded by the encoding unit 150, and can store the encoded data B-1 onto the third buffer 143. The buffer control unit 135 can control the encoded data B-1 to be provided to the error check code generating unit 145. In the phase 930, the buffer control unit 135 in some implementations provides the encoded data A-1, which is stored on the second buffer 142, to the writing control unit 110. The writing control unit 110 can write the encoded data A-1 into the magnetic disk 20 (S932).

In the following phase 940, the buffer control unit 135 in some implementations stores data C-1, which is part of data C, onto the first storage area 144. The buffer control unit 135 can provide the encoded data A-2, which is stored on the second buffer 142, to the writing control unit 110. The writing control unit 110 can write the encoded data A-2 into the magnetic disk 20 (S942). In some implementations, the writing control unit 110 writes the error check code and/or error correction code for the data A, which is stored on the second buffer 142, into the magnetic disk 20.

In some implementations, the buffer control unit 135 controls the data B-2 which is stored on the second storage area 146 to be encoded by the encoding unit 150, and can store the encoded data B-2 onto the third buffer 143. The buffer control unit 135 can provide the encoded data B-2 to the error check code generating unit 145. The error check code generating unit 145 can generate an error check code and/or error correction code for the data B, based on the encoded data B-1 and encoded data B-2. The buffer control unit 135 can store the error check code and/or error correction code, which is generated by the error check code generating unit 145, onto the third buffer 143.

In a phase 950, the buffer control unit 135 in some implementations stores data C-2, which is the remaining portion of the data C, onto the second storage area 146. The buffer control unit 135 can control the data C-1 which is stored on the first storage area 144 to be encoded by the encoding unit 150, and can store the encoded data C-1 onto the second buffer 142. The buffer control unit 135 can provide the encoded data C-1 to the error check code generating unit 145. In the phase 950, the buffer control unit 135 in some implementations provides the encoded data B-1 which is stored on the third buffer 143 to the writing control unit 110. The writing control unit 110 can write the encoded data B-1 into the magnetic disk 20 (S952).

Subsequently in the following phase 960, the buffer control unit 135 in some implementations stores data D-1, which is part of data D, onto the first storage area 144. The buffer control unit 135 can provide the encoded data B-2 which is stored on the third buffer 143 to the writing control unit 110. The writing control unit 110 can write the encoded data B-2 into the magnetic disk 20 (S962). In this case, the writing control unit 110 can write the error check code and/or error correction code for the data B, which is stored on the third buffer 143, into the magnetic disk 20.

In some implementations, the buffer control unit 135 controls the data C-2 which is stored on the second storage area 146 to be encoded by the encoding unit 150, and can store the encoded data C-2 onto the second buffer 142. The buffer control unit 135 can provide the encoded data C-2 to the error check code generating unit 145. The error check code generating unit 145 can generate an error check code and/or error correction code for the data C, based on the encoded data C-1 and encoded data C-2. The buffer control unit 135 can store the error check code and/or error correction code, which is generated by the error check code generating unit 145, onto the second buffer 142.

While the embodiments of the present invention have been described, the technical scope of the invention is not limited to the above described embodiments. It is apparent to persons skilled in the art that various alternations and improvements can be added to the above-described embodiments. It is also apparent from the scope of the claims that the embodiments added with such alternations or improvements can be included in the technical scope of the invention.

For example, some embodiments of the present invention can write data and an error check code into a magnetic disk immediately after generating the error check code based on the data.

A number of embodiments have been described. Nevertheless, it will be understood that various modifications may be made without departing from the spirit and scope of this disclosure. Accordingly, other embodiments are within the scope of the following claims.

What is claimed is:

1. A device comprising:
an error code unit configured to generate one or more error codes for each of a plurality of data sets including a first data set and a second data set to be written onto corresponding sectors of a medium;
a buffer unit having a plurality of buffers including a first buffer configured to store the first data set and a second buffer configured to store the second data set, the buffer unit configured to store the first data set and associated error code, and the second data set and associated error code in an associated buffer;
an encoding unit configured to encode the plurality of data sets, where at least one data set is encoded concurrently with the buffer unit storing another different data set in the associated buffer including encoding the first data set in the first buffer concurrently with the buffer unit storing the second data set in the second buffer; and
a control unit configured to write each encoded data set and a corresponding error code onto a corresponding sector including writing the first encoded data set in the first buffer onto a corresponding sector of the medium, the first encoded data set being written concurrently with the encoding unit encoding the second data set.

2. The device of claim 1, where the encoding unit is configured to encode the first data set in the first buffer to generate the first encoded data set concurrently with the buffer unit receiving the second data set for storage in the second buffer during a first period; and
where the control unit is configured to write the first encoded data set in the corresponding sector concurrently with the encoding unit encoding the second data set during a second period different from the first period.

3. The device of claim 2, where the buffer unit is configured to receive at least one additional data set during the second period; and
 where the encoding unit is configured to encode the at least one additional data set concurrently with the control unit writing the another different encoded data set in the corresponding sector during a third period.

4. The device of claim 1, where the encoding unit includes:
 a read cache to partition the plurality of data sets into a plurality of read data sets each having a data width smaller than a corresponding data set;
 a core unit to encode the plurality of read data sets and generate a plurality of core data sets; and
 a write cache to combine the plurality of core data sets and generate a plurality of encoded data sets to be written onto the corresponding sector.

5. The device of claim 1, where the error code unit is configured to receive the first data set to be written onto a first sector and the second data set to be written onto a second sector of the medium, and generate a first error code for the first data set and a second error code for the second data set; and
 where the first buffer stores the first data set and the first error code, and the second buffer stores the second data set and the second error code.

6. The device of claim 5, where the second buffer is configured to store the first encoded data set and the first error code.

7. The device of claim 5, where the error code unit is configured to receive a third data set to be written onto a third sector and generate a third error code for the third data set;
 where the buffer unit includes a third buffer for storing at least one of the third data set and the third error code; and
 where the encoding unit is configured to encode the second data set stored in the second buffer concurrently with the buffer unit storing the third data set in the third buffer.

8. The device of claim 7, where the control unit is configured to write the second encoded data set and the second error code in the second sector concurrently with the encoding unit encoding the third data set stored in the third buffer.

9. The device of claim 5, where the buffer unit is configured to:
 partition the first error code into a plurality of first units and the second error code into a plurality of second units; and
 insert the plurality of first units into the first data set to generate a first combined data set, and the plurality of second units into the second data set to generate a second combined data set.

10. The device of claim 9, where
 the buffer unit is configured to insert the plurality of first units into the first encoded data set to generate the first combined data set, and the plurality of second units into the second encoded data set to generate the second combined data set.

11. The device of claim 10, where the control unit is configured to write the first combined data set onto the first sector concurrently with the encoding unit encoding the second data set to generate the second encoded data set.

12. A method comprising:
 receiving a first data set to be written onto a first sector and a second data set to be written onto a second sector of a medium;
 storing the first data set in a first buffer and the second data set in a second buffer different from the first buffer;
 generating a first error code for the first data set and a second error code for the second data set;
 encoding the first data set to generate a first encoded data set including encoding the first data set in the first buffer concurrently with storing the second data set in the second buffer; and
 writing the first encoded data set and the first error code onto the first sector concurrently with encoding the second data set stored in the second buffer.

13. The method of claim 12, further comprising:
 receiving a third data set to be written onto a third sector of the medium; and
 storing the third data set in a third buffer concurrently with encoding the second data set and writing the first encoded data set and the first error code onto the first sector.

* * * * *